Aug. 7, 1945. W. M. BURA 2,381,034
GRINDING MACHINE
Filed March 4, 1942 6 Sheets-Sheet 4
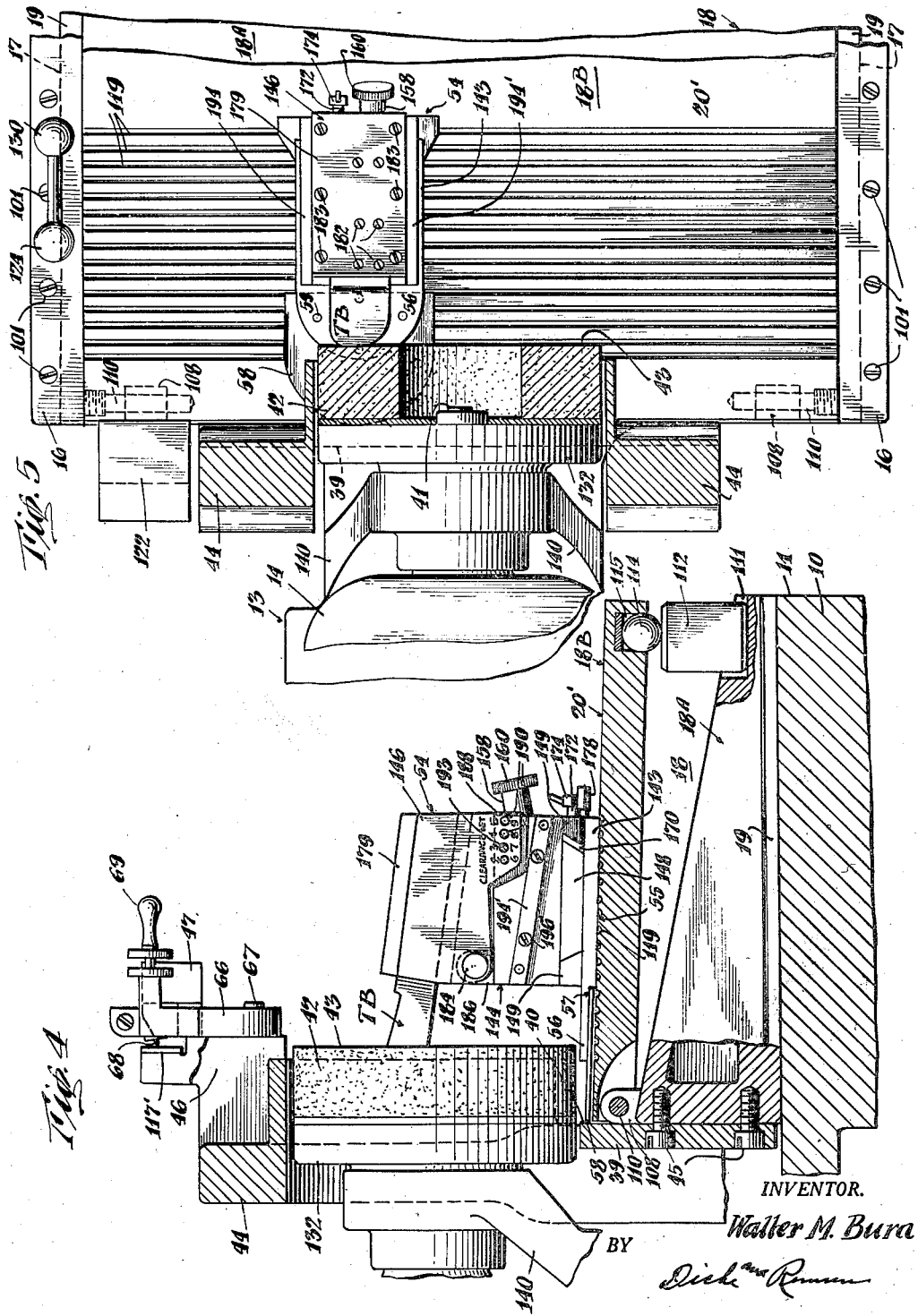
INVENTOR.
Walter M. Bura
BY
ATTORNEYS

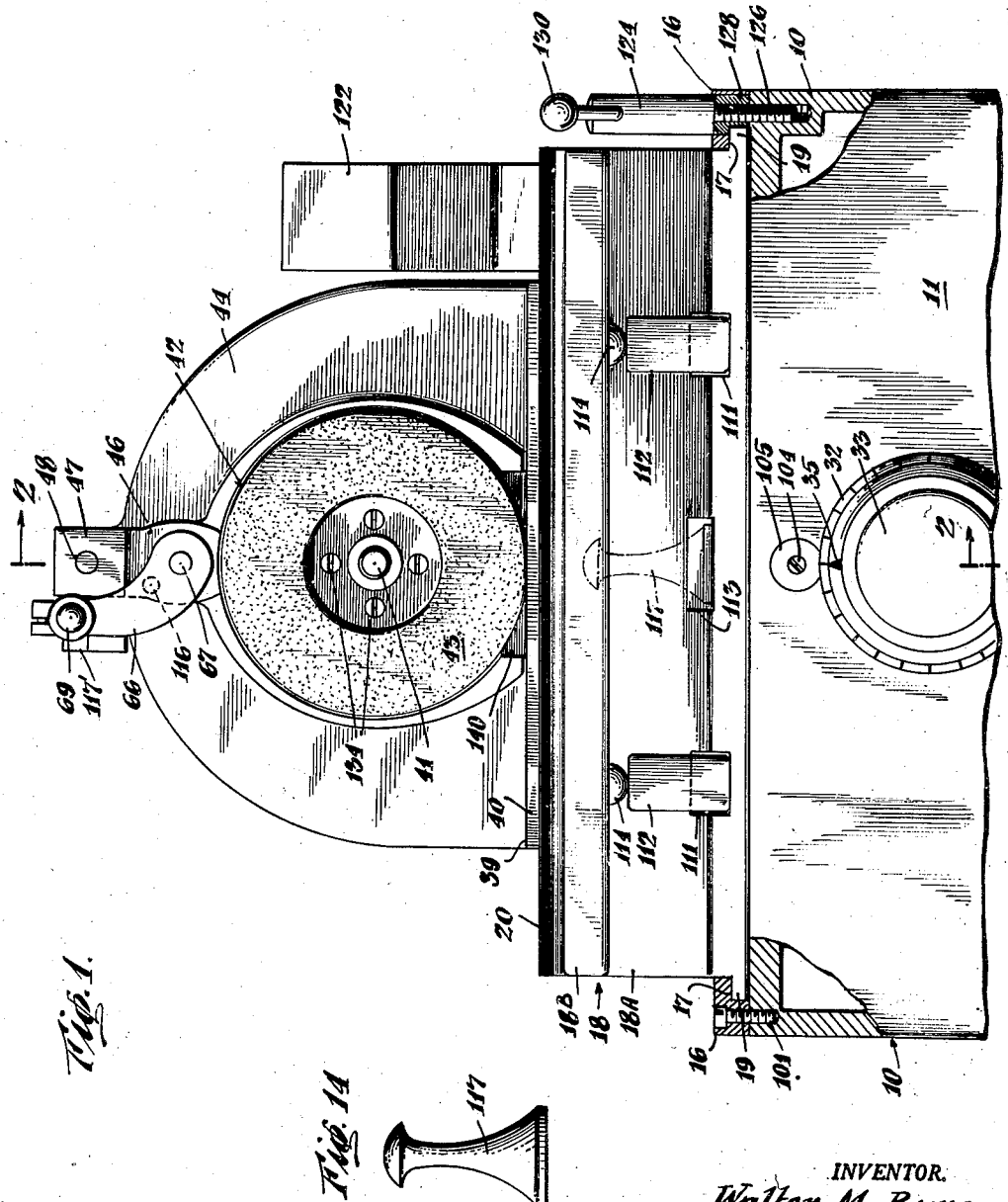

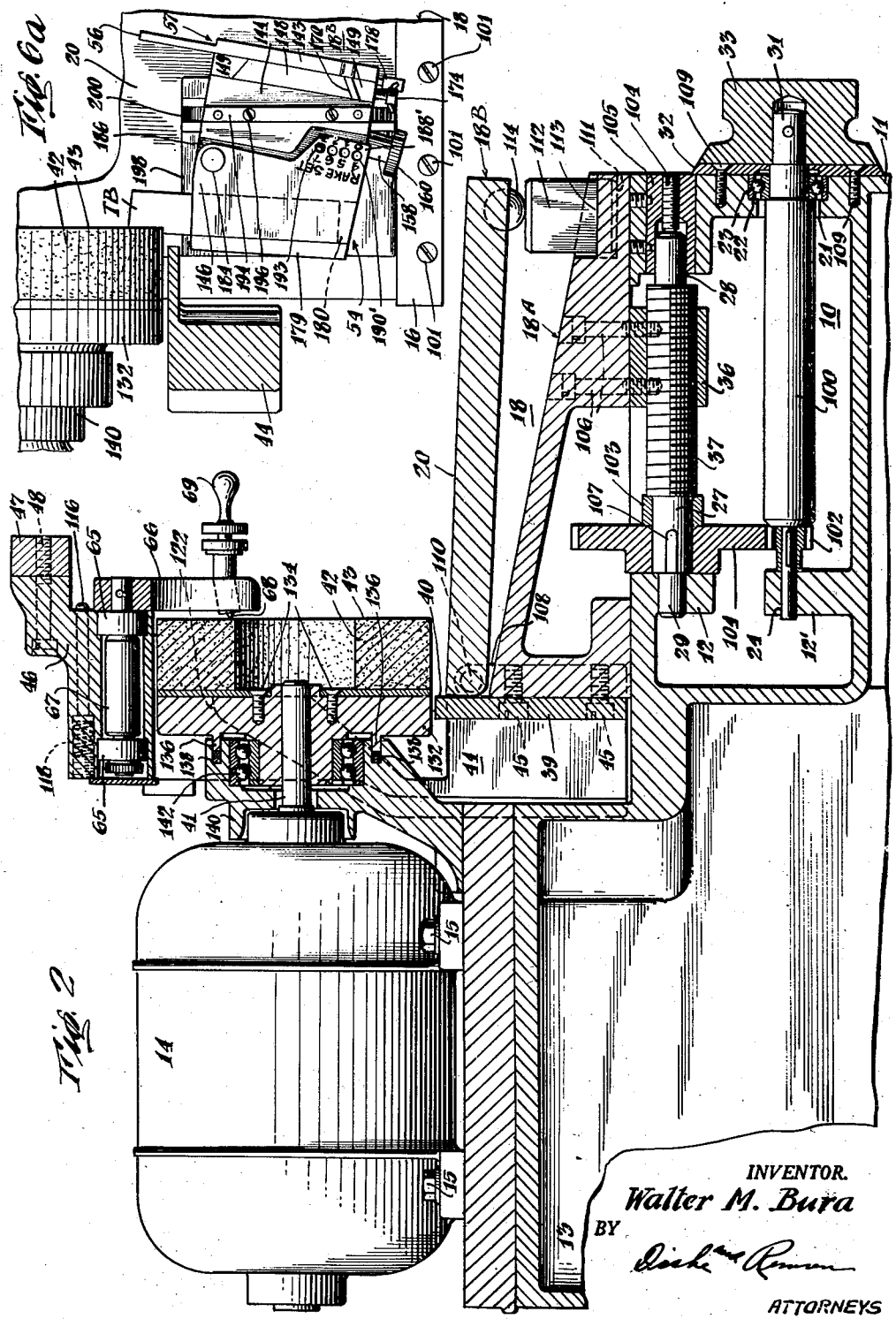

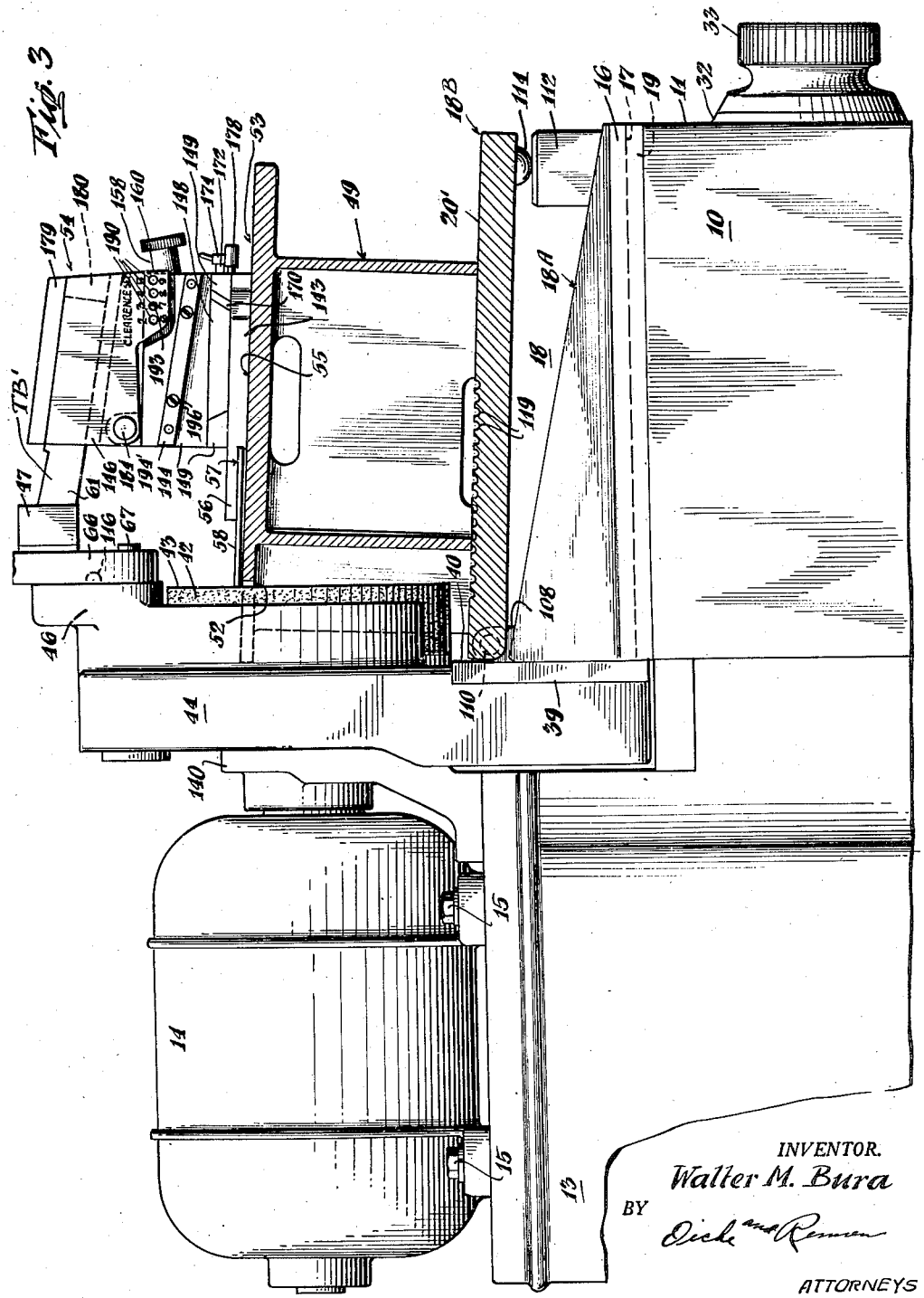

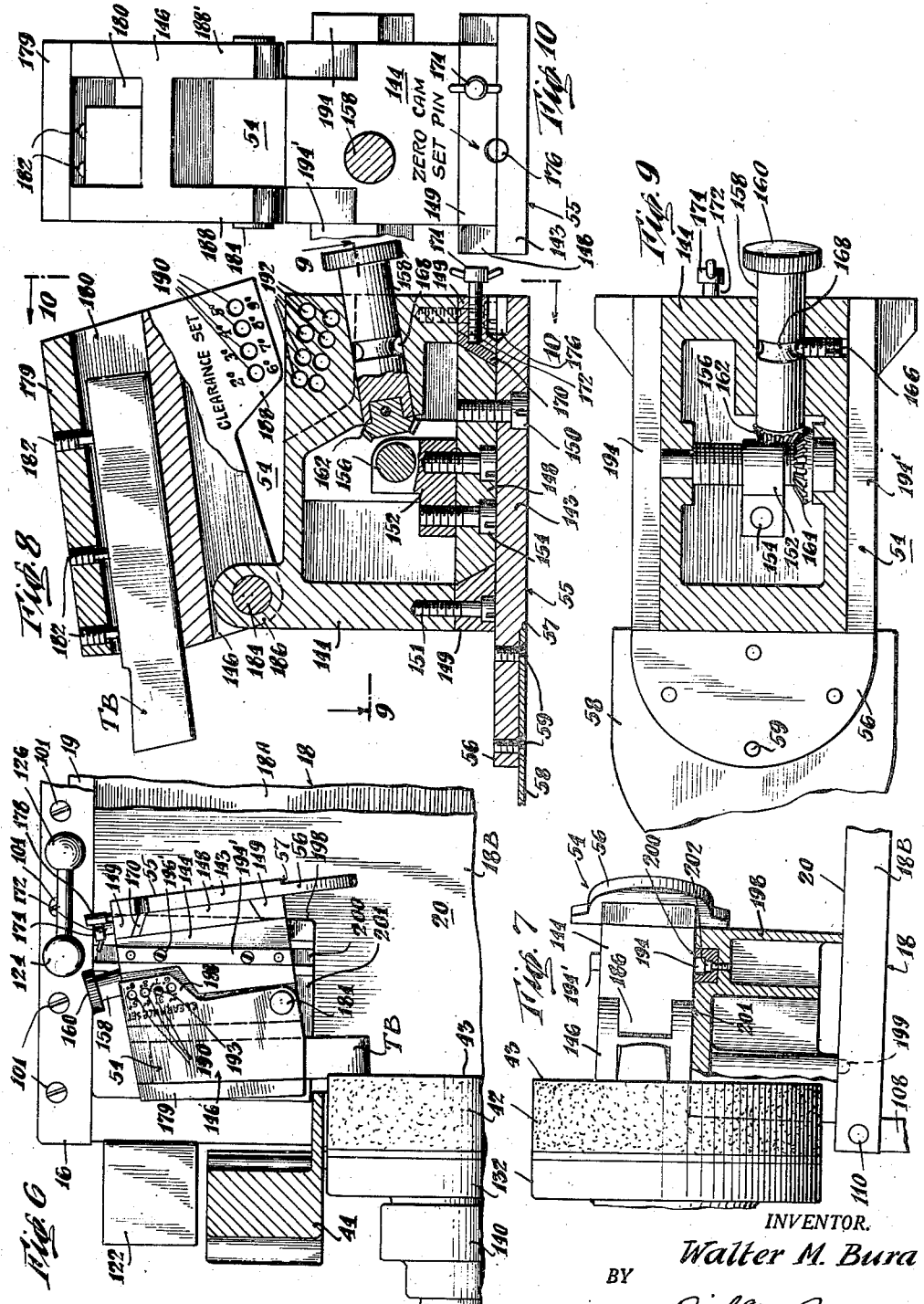

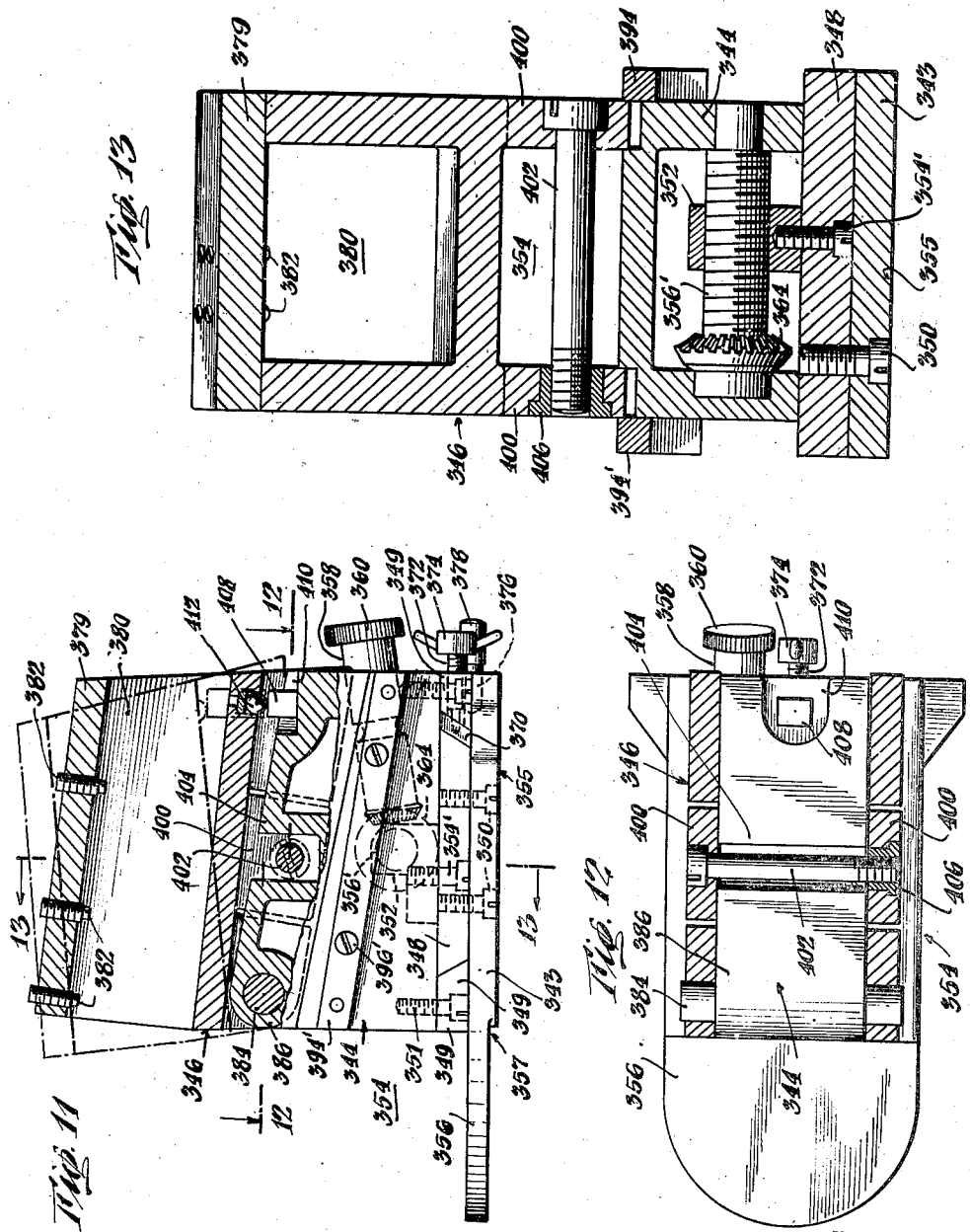

Patented Aug. 7, 1945

2,381,034

UNITED STATES PATENT OFFICE 2,381,034

GRINDING MACHINE

Walter Mark Bura, Orange, N. J., assignor to Norton Company, Worcester, Mass., a corporation of Massachusetts Application March 4, 1942, Serial No. 433,313

26 Claims. (Cl. 51—100)

This invention relates to grinding machines, and more particularly to the provision of apparatus for the precise generation of the form of tools, tool bits, milling cutters, cutter inserts, saw teeth and other ground forms of regular and irregular shape, such as lenses and lens grinding forms.

This application is a continuation-in-part of my co-pending application Serial No. 390,521, filed April 26, 1941, which is now Patent 2,375,619 issued May 8, 1945.

In modern machine tool practice, cutting tools are required which have accurate relief angles both at the end and one or both sides thereof, which tools in many cases must also be formed with very accurate contours (for example, as viewed from above). It is necessary in most cases to provide different angles of relief at the forward end of the tool from those on the side.

In most instances the corners of the cutting tool are rounded, the radius of curvature of the nose corresponding to the requirements of the particular use to which the tool is to be put, said radius being constant or varying. It will be readily understood that if the angle of relief at the end of the tool, viz., at the point where the rounding begins is different from the angle of clearance at the side (relief angle) of the tool, viz., where the round ends, it will be necessary to gradually change the angle of relief (as seen in a vertical cross-section taken along the radius of curvature at the point in question) from one extremity of the rounded corner to the other. Up to the time of applicant's development along these lines, no method for the formation of such a tool was known. The same problems occur in varying degrees to the grinding of other parts, such as milling cutters, cutter inserts, lenses and lens grinding forms, turbine blades, and other ground forms of regular or irregular shape which requires accurate varying contours.

It is an object of the present invention to provide suitable improved precision apparatus for forming a cutting tool in which the angular clearance is gradually changed from one portion of the tool to another, while the relief angle in the direction of tool feed remains constant.

It is another object to provide improved apparatus for forming a precision work-grinding apparatus capable of operation by unskilled workmen in such a way that geometrically accurate work pieces may be formed.

It is another object of the invention to provide apparatus whereby the contour of a work piece on the ends and both sides thereof either with or without connecting curves may be more precisely formed under the control of a pattern.

It is another object to provide improved apparatus whereby a tool may be precisely formed in which the clearance or relief angle is gradually changed from one portion of the tool to another while the contour thereof is being formed either with or without the use of a controlling pattern.

Another object of the invention is to provide improved apparatus for quickly and precisely forming a controlling pattern.

Another object of the invention is to provide apparatus, for accurately forming a controlling pattern larger than the work piece to be ground.

Another object is to form such a controlling pattern provided with such angles of relief that when a tool, for example, is subsequently formed under the control of said controlling pattern, the controlling pattern will bear with line contact against a suitable reference abutment.

Another object is the provision of apparatus for grinding tools with accurate side and end relief, adapted for side cutting.

Another object is to provide improved means for varying the various clearance or relief angles in accordance with the use to which the tool is to be put.

Another object of this invention is to provide a grinding machine capable of forming a tool having a cylconoid surface as hereinafter defined.

Still another object of this invention is to provide an improved angularly adjustable table forming the working surface for the grinding apparatus.

A still further object of this invention is to provide improved forms of a tool holder having novel means for adjusting the angular position of the tool relatively to the face of the grinding wheel and/or novel means for laterally shifting the tool relatively to the controlling pattern.

A still further object of this invention is to provide an improved arrangement for grinding the top of a tool with suitable back and side rake.

These and other objects and advantages of this invention will be apparent from the following specification and the accompanying drawings of several possible embodiments of the invention, in which drawings:

Fig. 1 is a partial front elevation of an improved grinding machine formed in accordance with the present invention;

Fig. 2 is a partial cross-sectional view along the line 2—2 of Fig. 1;

Fig. 3 is a partial cross-sectional view, similar to Fig. 2, of a slightly modified apparatus, showing a tool holder in position for the grinding of a controlling pattern;

Fig. 4 is a partial view, similar to Fig. 3, showing the tool holder in position for grinding of the tool;

Fig. 5 is a top view, partially in section of the apparatus illustrated in Fig. 4;

Fig. 6 is a partial top view, similar to Fig. 5, showing the tool and tool holder in position for grinding the top of the tool;

Fig. 6A is a top view, similar to Fig. 6, showing the tool holder in a reversed position;

Fig. 7 is a side view of the apparatus illustrated in Fig. 6, showing the rake grinding fixture in cross-section;

Fig. 8 is an enlarged cross-sectional view of the tool holder illustrated in Figs. 3 to 7 inclusive;

Fig. 9 is a horizontal, partial sectional view taken along the lines 9—9 of Fig. 8;

Fig. 10 is a rear elevation of the tool holder illustrated in Fig. 8, as seen along the line 10—10 of that figure;

Fig. 11 is a vertical view, partially in cross-section of a modified type of tool holder;

Fig. 12 is a horizontal cross-sectional view along the line 12—12 of Fig. 11;

Fig. 13 is a vertical sectional view along the line 13—13 of Fig. 11; and

Fig. 14 is a vertical elevation of the temporary sine bar plateholder indicated in Fig. 1.

The improved apparatus illustrated in Figs. 1 and 2 consists generally of a base or frame 10 having a front wall 11, intermediate walls 12 and 12' and a rearward extension 13. A motor 14 is preferably mounted upon the said rearward extension 13 by suitable means such as bolts 15. Top strips 16 having under-cut guide grooves 17 are attached along opposite sides of the frame 10 by suitable means such as screws 101. A slidable carriage generally indicated at 18 and to be described in more detail hereinafter, is provided with a base member 18A having projecting flanges 19 adapted to slide in the guide groove 17.

Means, illustrated in detail in Fig. 2, are provided for accurately moving the carriage 18 relatively to the frame 10. Such means may comprise a threaded nut 36 suitably attached to the base member 18A of the carriage 18 by suitable means such as screws 106. This nut engages the threaded part 37 of a feed screw generally indicated at 27 whose forward end 28 is preferably journalled in a suitable bearing 105 mounted in the front wall 11 of the frame 10, and whose rear part 29 is journalled in the intermediate wall section 12 of the frame 10. Longitudinal shifting of the feed screw is prevented by means of collar 103 at the rear thereof, and by means of stop pin screw 104 extending co-axially and abutting against the forward end 28 of the feed screw, and mounted within the bearing 105. The front wall 11 of the frame 10 is also provided with a bore 21, enlarged as at 22 to receive a ball bearing 23, while the partial intermediate wall section 12' is provided with a bore 24, aligned with the bore 21. A shaft 100 parallel to the feed screw 27 is mounted at one end in the ball bearing 23 and at its other end in the bore 24, and provided with a pinion 102 engaging a gear 104 connected to the feed screw 27 by suitable means such as the key 107. The forward end 31 of the shaft 100 is provided with a suitable indicator 33 cooperating with a dial 32 attached to the front wall 11 by suitable means such as screws 109. Rotation of the indicator 33 resulting in rotation of the shaft 100 and feed screw 27 will, as is obvious to those skilled in this art, accordingly result in movement of the nut 36 along the threaded portion 37 of the feed screw, with consequent shifting of the carriage 18 relatively to the frame 10. A pointer 35 cooperating with suitable indicia on the plate 32 may be used to indicate the particular position of the carriage. Since, as will be explained more clearly hereinafter, the carriage 18 is not shifted for a long period after it has once been set, I also prefer to provide suitable means for locking the carriage relatively to the base, as more clearly shown in Fig. 1. Such means may consist of a clamp 124 having an extension 126 threaded in the frame 10, which threaded extension passes through a grooved block 128 in one of the top strips 16. Rotation of the clamp 124 by means of the handle 130 will, through threaded extension 126, press the block 128 against the flange 19 of carriage base member 18A, and thus prevent relative sliding motion of the carriage 18.

The carriage 18 includes not only the base member 18A referred to above, but also a sine bar plate 18B, the top surface 20 of which is adapted to form the working surface for the grinding machine. The sine bar plate 18B is provided with suitable pivots 110 near its rear edge which are journalled in spaced vertical extensions 108 of the base member 18A. The forward upper surface of the base member 18A is provided with a pair of spaced depressions 111 having accurately formed surfaces on which are placed accurate gauge blocks 112. The lower surface of the sine bar plate, on the other hand, is provided with hemispherical projections adapted to engage the upper surface of the gauge blocks, these hemispherical projections being illustrated in the form of steel balls 114 attached in any suitable manner within cut out portions 115 on the lower surface of the sine bar plate. It will be obvious to those skilled in this art that the angular position of the sine bar plate 18B will accordingly depend upon the height of the gauge blocks 112. It is contemplated that a series of several pairs of such gauge blocks be provided with the apparatus, to provide various angular positions of the sine bar plate. The gauge blocks may be numbered or otherwise inscribed in a suitable manner to indicate the angular position of the sine bar plate with reference to the horizontal, hereinafter called the sine bar plate angle. When the gauge blocks are being changed to vary the angular position of the sine bar plate, it is necessary to temporarily support the sine bar plate. For this purpose I have provided a generally central depression 113 in the upper surface of the base member 18A, adapted to receive a temporary sine bar plate support 117, illustrated in dotted lines in Fig. 1 and shown in more detail in Fig. 14. In connection with the use of ground steel balls 114 as sine bar plate stops engaging the top of the gauge block 112, it is to be pointed out that while it is not intended to limit this invention to the specific use of such ground steel balls, it is preferable to use some similar hemispherical surface (as contrasted, for example, to a plane abutting surface), so that proper contact between the sine bar plate and the gauge blocks will be maintained for all angular positions of the sine bar plate. In Figs. 3, 4 and 5 I have also disclosed a modification of the upper surface of the sine bar plate 18B, in which case the surface 20' may be provided with a series of transversely extending grooves 119.

As is more particularly illustrated in Fig 2, the motor 14 mounted upon the rearward extension 13 of the frame 10 is adapted to drive a grinding wheel 42. For this purpose, the motor shaft 41 may be connected in any suitable manner to a block 132, to which the grinding wheel is attached by suitable means, such as screws 134. This block may be suitably rotatably journaled in a ball bearing 142 mounted in a vertical extension 140 of the rear frame section 13. Since it is essential for accurate grinding purposes that the face 43 of the grinding wheel 42 be maintained in a predetermined position, the rear of the block 132 may also be provided with a suitable annular flange 136 extending into a suitable annular groove 138 formed in the extension 140.

Since, in accordance with the principles of this invention, it is important that the work to be ground and the controlling pattern bear a proper and accurate relationship to the face of the grinding wheel, the rear of the base 18A of the carriage 18 is provided with a vertical plate 39, attached thereto by suitable means such as screws 45, which plate extends above the upper surface 20 of the sine bar plate 18B, and whose front face 40, parallel to the face 43 of the grinding wheel serves as a reference abutment. The rear portion of the base member 18A is also provided with a vertical frame work 44 which, as can be best seen in Fig. 1, generally extends about the periphery of the grinding wheel 42. The upper part of the frame 44 is formed with a boss 46 from which projects forwardly a calibrating block 47, attached to the bar by suitable means such as screw 48. This master calibrating block is formed with its front surface parallel to both the face 43 of the grinding wheel 42 and the base 40 of the reference abutment 39. Within the boss 46 are also suitably mounted bearings 65 rotatably supporting a shaft 67 to which is connected an arm 66 carrying a diamond truing tool 68. A handle 69 on the arm 66 is provided for moving the arm and the truing tool 68 along the face of the grinding wheel. By means of a slidable detent 116 working under the action of spring 118, and cooperating with a suitable opening (not shown) in the arm 66, the truing tool may be held out of contact with the grinding wheel, when not in use, as shown in Fig. 1. As will be more clearly demonstrated as the description proceeds, it is necessary for the purposes of the present invention that the face 43 of the grinding wheel 42 be positioned exactly midway between the face of the reference abutment 47, serving as an abutment for the master tool, or work-piece, and the reference abutment 40, serving as an abutment for the controlling pattern. To properly effect this result, a diamond set plate 117' is also attached to the boss 46, the front face of this diamond set plate being positioned exactly midway between the faces of the reference abutments 40 and 47. Accordingly, if the diamond cutting tool 68 is placed against this plate 117', when the cutting tool is passed across the face of the grinding wheel, it will accurately position this face with respect to the two reference abutments, the amount of cutting of the grinding wheel face depending upon the position of the carriage 18. Instead of using a diamond set plate as illustrated, a suitable gauge (not shown) by which the position of the diamond tip can be accurately determined can be attached to the framework 44, as will be clear to those skilled in this art. When the face on the grinding wheel has once been dressed, the carriage 18 is locked relatively to the frame 10, in a manner previously described.

In the operation of my grinding apparatus, the first step is in the formation of a suitable controlling pattern, in accordance with a master tool or work-piece. For the guiding of tools, for example, the apparatus necessary to carry out this step is illustrated in Fig. 3 in which a tool holder, generally indicated at 54, is mounted upon a step block 49 so formed that its upper surface 53 is parallel to the working surface 20' of the sine bar plate 18B. The tool holder 54 supports a master tool TB' against the reference abutment 47, and a pattern 58 to be ground against the face 43 of the grinding wheel 42. In order that the master tool TB' be moved along the reference abutment 47 with line contact, the tool holder is set at such an angle with reference to the surface 53 and the sine bar plate 18B is set at such an angle that the sum of these two angles is equal to the clearance or relief angles of the master tool when the latter is in a substantially vertical plane perpendicular to the face of the reference abutment, while when the tool is turned at right angles to this plane, the relief angle on the side of the tool will equal the angular position of the sine bar plate 18B. In order that the step block may be positioned close to the grinding wheel 42 its front central section is provided with a cut-out portion 52.

After the controlling pattern 58 has been ground with a contour corresponding to that of the master tool TB', the step block 49 is removed, a tool TB to be ground is placed in the tool holder 54, and the latter then placed upon the working surface of the machine, as shown in Figs. 4 and 5. The position of the tool TB in the tool holder is first determined by placing the front face of the tool against the tool set gauge 122, movable with, but spaced slightly forwardly of, the reference abutment 40. The controlling pattern 58, in this case, will eventually work against the reference abutment 40, and the tool TB is ground with the proper clearance and relief angles against the face of the grinding wheel 43. The theory behind the grinding operation performed by this apparatus, whereby the tool to be ground will conform in all respects to the master tool, and the clearance angle gradually changes from the front to the side of the tool in a smooth and accurate manner, need not be particularly described in the present application, since the method per se of grinding the tool forms no part of the present invention, is more fully covered and described in my aforesaid co-pending application Serial No. 390,521. As described in that case, however, it will be found that when the plane of the tool-supporting table is not at right angles to the plane of the wheel face and the contour of the tool (i. e., the directrix) is a curved line other than circular, the grinding of the clearance angle forms a surface on the tool to which mathematicians have apparently not as yet ascribed a name. The mathematical and geometrical details of such a surface are more clearly described in my above-mentioned co-pending application in which, in the absence of a known name therefore, has been termed a "cylconoid surface." One of the improvements of the present construction, moreover, lies in the fact that the relative positioning of the master tool TB' and the pattern 58 results in a pattern larger than the original tool, whereby, when this pattern is used to control the grinding of a new tool, as in Figs. 4 and 5, more accurate results can be obtained.

One of the features of the present invention involves the construction of an improved tool holder, to be used in connection with the arrangement for obtaining a larger control pattern, and the adjustable sine bar plate, previously described. A preferred form of such a tool holder 54, is more particularly illustrated in Figs. 8, 9 and 10. The tool holder consists of a bottom section comprising a bottom plate 143 and a slidable section 144, and a top section 146. The bottom plate 143 has a smooth plain bottom surface 55, and is provided with a forward extension 56 having a recess 57 receiving the controlling pattern 58. The controlling pattern is rigidly attached to the bottom plate in the recess 57 by suitable means such as screws 59. It is desirable, although not necessary, that the underside of the controlling pattern 58 lies flush with the lower surface 55 of the bottom plate of the tool holder. In any event, the under surface of the controlling pattern should not project below the bottom surface 55 of the plate. Above the bottom plate is mounted a guide 148, attached to the bottom plate by suitable means such as screws 150. Above the guide is a nut 152, attached thereto by suitable means such as screws 154. A threaded shaft 156, rotatably mounted in the slidable section 144 of the tool holder, engages the nut 152. Rotatably mounted in the slidable section is a turn shaft 158 having on one end a gear 162 engaging a similar gear 164 attached to the threaded shaft 156. Now it will be seen that the slidable section 144 is provided with slides 149, attached thereto by means such as screws 151, and engaging the guide 148 attached to the bottom plate. Thus, the section 144 is transversely slidable relatively to the bottom plate 143, and this sliding motion will result by rotation of the turn shaft 158, or its knob 160 which, in turn, rotates the threaded shaft 156 in the nut 152. In order to hold the turn shaft 158 in place, while still permitting its removal if desired, the turn shaft is preferably provided with an annular groove 168 into which a removable lock pin 166 may extend. In order to prevent relative sliding movement between the slidable section 144 and the lower plate, a gib 170 may be provided between the guide 148 and one of the slides 149, and a suitable pin 172 having a turning handle 174, threaded into that slide so that it may be screwed against the gib which, in turn, will then press against the guide 148. This permits a relative locking between the slidable parts in substantially any position to which they have been moved. Since, however, in the usual case, and particularly in making the controlling pattern from the master tool, a zero transverse relationship between the tool and the controlling pattern is desired, I have also provided semi-circular openings 176 in the slidable section and the bottom plate which coincide for a zero displacement between the tool and controlling pattern. A suitable pin 178 may then be inserted in the aligned openings to hold and maintain this zero displacement relationship.

The top section 146 of the tool holder 54 is suitably pivoted to vertical extension 186 of the slidable section 144 by suitable pivots 184. The axis of the pivots 184 lies substantially parallel to the plane of the lower surface 55 of the bottom plate 143. The top plate 179 of the top section forms with the latter a suitable longitudinal tool-receiving bore or opening 180. Screws 182 in the plate clamp the tool TB in the bore 180 in the position desired. Other screws 183 (Fig. 5) hold the top plate onto the top section. In order that the angular relationship between the tool and the lower bottom surface 55 of the bottom plate can be accurately determined, I have provided the adjustable top section with a depending portion 188 having a plurality of aligned bores 190, adapted to cooperate with two lines of bores 192 in the slidable section. It will be at once apparent to those skilled in this art that depending upon the angular position of the top section, one of the bores in the top section will be aligned with one of the bores in one of the rows of the slidable section. An accurate angular relationship may be maintained if, for example, as illustrated, the top section is provided with four bores, each of which may cooperate with one of the bores in each line of bores in the slidable section. For example, a clearance or relief set of 2° can be obtained if the bore on the extreme left of the top section is aligned with the upper extreme left bore of the slidable section, whereas if this same bore is aligned with the lower left hand bore in the slidable section, a clearance set of 6° will be obtained. A suitable cylindrical pin 193 will be inserted in the properly aligned bores, depending upon the clearance set desired. In Fig. 3, for example, this pin is in the bore corresponding to a clearance set of 7°.

The tool holder 54 may be used to hold the tool TB to grind the top of the tool for the purpose of providing a suitable rake. In this case, the tool holder is turned on its side and mounted on a rake grinding fixture 198 (Figs. 6 and 7), positioned on the working surface 20 of the sine bar plate 18B by means of a suitable projecting pin 199. In this case, the upper surface 201 of the rake grinding fixture is arranged at all times parallel to the working surface 20 and is provided with a sunken female slotted guide 200 attached to the rake grinding fixture by suitable means such as the screw 202. A tongue 194 is attached to the side of the slidable section 144 of the tool holder 44 and is adapted to be slidably guided in the slot 200 parallel to the face 43 of the grinding wheel. Movement of the tool holder 54 on the rake grinding fixture 198 will accordingly move the top of the tool TB against the face of the grinding wheel. In this case, the angular relationship between the top section 146 of the tool holder to its slidable section 144, as determined by the aligned openings 190 and 192, will equal the back rake angle. Additionally, as will be obvious to those skilled in this art, the side rake of the top of the tool will be determined by the particular relationship of the sine bar plate 18B to the face of the grinding wheel 43, or equal to the sine bar plate angle.

In order that the true rake set may be directly read upon the tool holder, so as not to confuse this with the clearance set marked upon one side of the tool holder (Fig. 8), the opposite depending portion 188' of the top section of the tool holder may be provided with a different set of indicia as shown, for example, in Fig. 6a. In this case, a similar tongue 194' will slide in the slot 200, the rake set being directly readable upon the tool holder. The operation of the device will, however, be exactly the same. In both Figs. 6 and 6A, the pin 193 is in the aligned holes corresponding to a rake set of 7°. The tongues 194 and 194' are respectively attached to the side of the tool holder by suitable means such as screws 196 and 196'.

Figs. 11, 12 and 13 illustrate a slightly modified form of tool holder, particularly with respect to angularly adjusting the top section relatively to the slidable section. This modified form of tool holder, generally indicated as 354 is again provided with a base plate 343 having a forward extension 356 provided with an undercut section 357 adapted to receive the controlling pattern (not shown), and a plane bottom surface 355. The guide 348 is attached to the bottom plate 343 by screws 350, while the nut 352 is, in turn, attached to the guide 348 by screws 354'. The threaded shaft 356' engages the nut 352 and is rotatably supported in the slidable section 344. Again, this threaded shaft is provided with a suitable pinion 364 engaged by a pinion on the turn shaft 358, rotated by means of the knob 360. By reason of this construction, similar to that shown in the tool holder 54, illustrated in Figs. 8, 9 and 10, transverse movement of the tool relatively to the bottom plate and controlling pattern is possible. Dove-tailed slides 349 engage the guide 348, and between one of the slides and the guide is positioned a gib 370 which may be pressed against the guide 348 by a suitable screw 372 having a turning handle 374, threaded in one of the guides. A zero cam set opening is also provided, which, upon insertion of the pin 378, holds the relatively slidable parts in a normal predetermined position. The top section 346 of the tool holder 354 is likewise provided with suitable pivots 384 journaled in vertical extension 386 of the bottom section, about an axis parallel to the lower surface of the bottom plate 343. The slidable section 344 is also provided with oppositely spaced cut-out vertical walls 404, the cut-out section serving to receive a clamping pin 402 connected across the depending vertical extensions 400 of the top section 346. The upper part of the slidable section is also provided with a horizontal depression 410 adapted to receive a gauge block 408. The top section 346 has a correlated depending part, preferably comprising a spherical ground ball 412, adapted to rest on top of the gauge block 408. Similarly to the sine bar plate construction previously described, it will be seen that the angular position of the top section will depend upon the height of the intermediate gauge block 408, and, in accordance with the present invention, it is assumed that a plurality of different size gauge blocks will be provided to give various clearance and rake settings. In order to hold the top section relatively to the bottom section in the angular position determined by the intermediate gauge block, the depending extensions 400 of the top sections are adapted to engage the outside of the vertical extension 404 on the slidable section. Tightening of the clamp screw 402, the threaded portion of which is preferably adapted to engage a suitable bushing 406 in one of the depending sections 400, will accordingly press the depending sections 400 against the vertical section 404. Because of the slight resiliency of the depending sections 400, a suitable clamping action to hold the top section and bottom section in their predetermined angular position is possible. Similarly, to the construction illustrated in Figs. 8, 9 and 10, the top section 346 is provided with a top plate 379 enclosing a longitudinal tool-receiving bore 380. Suitable screws 382 serve to clamp the tool (not shown), in this bore in the desired position.

One advantage of the construction illustrated in Figs. 11, 12 and 13, over the tool holder illustrated in Figs. 8, 9 and 10, results from the fact that the clearance angle may be more widely adjusted for the same size tool holder and, if desired, the tool may be even given a negative clearance angle, as indicated in dot-dash lines in Fig. 11, merely by providing a suitably large gauge block.

Additionally, it will be clear to those skilled in this art that this type of tool holder permits the grinding of tool with a side cutting edge instead of a front feed cut. In this case the sine bar table will be set at an angle so as to give the desired side or cutting relief, say 10°. The tool holder will, in this case be set with a negative angle of say 8°. Accordingly, when the tool holder is substantially perpendicular to the face of the grinding wheel, the nose of the tool will be ground with a relief angle of 10° minus 8°, or 2°, while this angle will change until when the tool holder is parallel to the face of the grinding wheel, effect of the angular position of the tool holder is lost and a full side relief of 10° will be ground on the side of the tool, and the latter may then be used as a side-feed cutting tool.

While I have described my improved grinding apparatus and certain modifications thereof in more or less detail to comply with the requirements of the statute, it is nevertheless desired that this detail description be considered merely as illustrative and not as limiting, and it is to be understood that further changes and modifications in the apparatus may be made by those skilled in this art without departing from the invention as defined in the following claims. For example, as has been indicated above, my improved grinding apparatus, with the exception of the details of the specific forms of tool holder, may be used to grind other work pieces such as milling cuttters, cutter inserts, lenses, lens grinding forms, turbine blades, and other regular or irregular shapes. The accuracy of my sine-bar table construction, in conjunction with the accurate positioning of the reference abutments relative to the face of the grinding wheel makes possible the forming of extremely accurate controlling patterns, with a resultant precision grinding of the various work pieces.

I claim:

1. Apparatus for grinding tools and the like comprising, in combination, a frame, a top slidably mounted on said frame for forward and reverse movement and forming a working surface for said apparatus, a grinding wheel rotatably supported on said frame, mounted above the rear part of said top and having its front face positioned in a substantially vertical plane at right angles to the direction of movement of said slidable top, said slidable top comprising a base member slidable on said frame in a substantially horizontal plane, having a pair of spaced vertical extensions formed along the edge substantially beneath said grinding wheel and at least one substantially horizontal supporting face formed on its upper surface near the opposite edge, and also a sine bar plate whose upper surface forms said working surface, pivoted at one edge between said vertical extensions, means connected with and depending from the lower surface of said sine bar plate, spaced near the opposite edge of the same and correlated with the supporting face on said base member, said means being provided with a substantially spherical lower contacting surface, at least one gauge block adapted to fit on said supporting face intermediate the same and the spherical extension means on said sine bar plate for supporting said opposite edge of said sine bar plate relatively to said base member, whereby the angular relationship between the working surface of said sine bar plate and the plane of the face of said grinding wheel depends upon the height of the intermediate gauge block, and a substantially vertical plate attached along the edge of said base member beneath said grinding wheel, and extending above and adjacent the rear edge of the sine bar plate to form a reference abutment, and a tool holder adapted to support the work to be ground against the front face of said grinding wheel, said tool holder having a bottom plane plate slidable upon the upper surface of said sine bar plate, means for holding the work to be ground at an angle to the bottom plane plate, and a controlling pattern attached to said bottom plate, extending forwardly of the same and adapted to abut the said reference abutment, whereby movement of said tool holder on said sine bar plate, with the work to be ground against the grinding wheel, in accordance with the control of said controlling pattern in cooperation with said reference abutment, grinds the work in accordance with the shape of said controlling pattern, while simultaneously the work is provided with an end relief angle equal to the sine bar plate angle plus the angle of the work piece relatively to said bottom plate, when the tool holder is in a vertical plane at right angles to the plane of the grinding wheel face, such relief gradually changing upon turning of the tool holder to a side relief equal to the sine bar plate angle alone, when the tool holder is turned into a vertical plane substantially perpendicular to its original vertical plane.

2. The combination according to claim 1, in which the upper surface of said base member is provided with a substantially centrally disposed depression adapted to hold a temporary sine bar plate support when said gauge block is removed.

3. The combination according to claim 1, in combination with a threaded nut attached to the bottom of said base member, a threaded shaft engaging said nut and rotatably supported in said frame, a second shaft rotatably supported in said frame, means for rotating said second shaft, and reduction gear means drivably interconnecting said shafts in such a manner that the threaded shaft rotates more slowly than said second shaft, whereby upon rotation of said second shaft said base member is slowly shifted relatively to said frame to shift the position of said base member and said vertical reference abutment relatively to the face of said grinding wheel.

4. Apparatus for grinding tools and the like, comprising, in combination, a frame, a top slidably mounted on said frame for forward and reverse movement and forming a working surface for said apparatus, a grinding wheel rotatably supported on said frame, mounted above the rear part of said top and having its front face positioned in a substantially vertical plane at right angles to the direction of movement of said slidable top, said slidable top comprising a base member slidable in said frame in a substantially horizontal plane, having a pair of spaced vertical extensions formed along the edge substantially beneath said grinding wheel, and at least one horizontal depression formed in its upper surface near the opposite edge, and also a sine bar plate whose upper surface forms said working surface, pivoted at one edge between said vertical extensions, means connected with and depending from the lower surface of said sine bar plate, spaced near the opposite edge of the same and correlated with the depression in said base member, said means being provided with a substantially spherical lower contacting surface, a gauge block adapted to fit in said depression intermediate the same and the spherical depending means on said sine bar plate for supporting the said opposite end of said sine bar plate relatively to said base member, whereby the angular relationship between the working surface of said sine bar plate and the plane of the face of said grinding wheel depends upon the height of the intermediate gauge blocks, and a substantially vertical plate attached along the edge of said base member beneath said grinding wheel, and extending above and adjacent the rear edge of the sine bar plate to form a reference abutment, and a tool holder adapted to support the work to be ground against the front face of said grinding wheel, said tool holder comprising a bottom section having a plane lower surface adapted to slide upon the working surface of said sine bar plate, a top section pivotally connected to said bottom section about an axis parallel to the plane of said lower surface, means for clamping a tool to said top section, said bottom section being formed with a plurality of openings vertically spaced from one another and said top section being formed with one or more openings of the same size as those in the base member and positioned relatively to the latter so that upon pivotal movement of said top section one of the openings in said top section is aligned with one of the openings in said bottom section for a predetermined angular relationship between the tool and lower plane surface of said bottom section, pin means adapted to pass through said aligned openings for holding said tool and bottom section in the said predetermined angular position, and a controlling pattern attached to said bottom section, extending forwardly of the same and adapted to abut the said reference abutment on said base member beneath the grinding wheel, whereby movement of said tool holder on said sine bar plate with the work to be ground against the grinding wheel, in accordance with the control of said controlling pattern in cooperation with said reference abutment, grinds the work in accordance with the shape of said controlling pattern, while simultaneously the work is provided with an end relief equal to the sine bar plate angle plus the angle of the work piece relatively to the lower surface of said bottom section, when the tool is in a vertical plane at right angles to the plane of the grinding wheel face, such relief gradually changing upon turning of the tool holder to a side relief equal to the sine bar plate angle alone, when the tool holder is in a vertical plane substantially perpendicular to its original vertical plane.

5. Apparatus for grinding tools and the like comprising, in combination, a frame, a top slidably mounted on said frame for forward and reverse movement and forming a working surface for said apparatus, a grinding wheel rotatably supported on said frame, mounted above the rear part of said top and having a front face positioned in a substantially vertical plane at right angles to the direction of movement of said slidable top, said slidable top comprising a base member slidable on said frame in a substantially horizontal plane, having a pair of spaced vertical extensions formed along the edge substantially beneath said grinding wheel, and at least one horizontal depression formed in its upper surface near the opposite edge, and also a sine bar plate whose upper surface forms said working surface, pivoted at one edge between said vertical extensions, means connected with and depending from the lower surface of said sine bar plate, spaced near the opposite edge of the same and correlated with the depression in said spaced member, said means being provided with a substantially spherical lower contacting surface, a gauge block adapted to fit in said depression intermediate the same and the spherical depending means on said sine bar plate for supporting the said opposite edge of said sine bar plate relatively to said base member, whereby the angular relationship between the working surface of said sine bar plate and the plane of the face of said grinding wheel depends upon the height of the intermediate gauge blocks, and a substantially vertical plate attached along the edge of said base member beneath said grinding wheel, and extending above and adjacent the rear edge of the sine bar plate to form a reference abutment, and a tool holder adapted to support the work to be ground against the front face of said grinding wheel, said tool holder comprising a bottom plate having a plane lower surface adapted to slide upon the working surface of said sine bar plate, a guide mounted on said bottom plate, and a nut attached above said guide, a relatively slidable section having depending slides cooperating with said guide for permitting a transverse guided sliding movement of said section on said bottom plate parallel to the plane lower surface of the latter, a threaded shaft in said nut, rotatably supported on said slidable section, means on said slidable section for rotating said shaft in said nut to cause relative sliding movement of said slidable section and bottom plate, a top section pivotally connected to said slidable section, means for clamping a tool to said top section, means for holding said top section and tool in a predetermined angular relationship to said slidable section, and a controlling pattern attached to said bottom plate, extending forwardly of the same and adapted to abut the said vertical plate on said base member beneath the grinding wheel, whereby relative sliding movement of such slidable section relatively to said bottom plate shifts the position of the tool in the holder relatively to the controlling pattern, and movement of said tool holder on said sine bar plate with the work to be ground against the grinding wheel, in accordance with the control of said controlling pattern in cooperation with said reference abutment, grinds the work in accordance with the shape of said controlling pattern, while simultaneously the work is provided with an end relief equal to the sine bar plate angle plus the angle of said top section relatively to said slidable section, when the tool holder is in a vertical plane at right angles to the plane of the grinding wheel face, such relief gradually changing upon turning of the tool holder to a side relief equal to the sine bar plate angle alone, when the tool holder is in a vertical plane substantially perpendicular to its original vertical plane.

6. The combination according to claim 5, in which the means for rotating said shaft includes a pinion on said shaft, and a turn shaft rotatably mounted in said slidable section and having a pinion engaging the pinion on said shaft.

7. The combination according to claim 5, in which said slidable section and said base plate are each provided with concomitant semi-circular openings, in combination with a cylindrical pin insertable in said openings when the same are aligned for holding said slidable section and base plate in a predetermined relationship.

8. Apparatus for grinding tools and the like, comprising, in combination, a frame, a grinding wheel rotatably supported on said frame, a top slidably mounted on said frame and forming a working surface for said apparatus, means for sliding said top toward and away from the base of said grinding wheel in a direction substantially at right angles to the plane of said wheel, said slidable top comprising a base member slidable on said frame in a substantially horizontal plane, a vertical plate attached to said base member, having a plane face forming a first reference abutment positioned beneath, behind and parallel to the face of said grinding wheel, said base member being formed also with a vertical extension projecting above said grinding wheel, a plate attached to said vertical extension and having a plane face mounted above, forwardly of and parallel to the face of said grinding wheel to form a second reference abutment, the distance from the face of said grinding wheel to each of said reference abutments being equal, and a sine bar plate pivotally connected to said base member at its edge near said first reference abutment, the upper surface of said sine bar plate forming the working surface of said apparatus, a tool holder having a plane bottom surface, means for clamping a tool in said tool holder at a predetermined angle to its bottom surface, a controlling pattern attached to said tool holder at a predetermined distance beneath the tool, and a step block having opposed parallel faces, one of which is adapted to contact the working surface of said apparatus and the other of which is adapted to support the bottom surface of said tool holder at such a distance above the working surface that when the tool holder is mounted on said step block, the tool therein, serving as a master guide, is controlled by said second reference abutment, while the controlling pattern contacts the face of the grinding wheel and, upon movement of the tool in cooperation with said second reference abutment, is ground in accordance with the shape of said tool, whereby upon removal of said step block and the positioning of said tool holder directly upon said working surface, said controlling pattern coacts with said first reference abutment, the work in said holder contacts the face of said grinding wheel and is ground in accordance with the shape of said controlling pattern, while the front and side relief of said tool are determined by the angular position of said tool relative to the bottom surface of the tool holder and the sine bar plate angle.

9. The combination according to claim 8, in which the base member of said slidable top is formed with at least one horizontal depression in its upper surface near the edge opposite said first reference abutment and a pair of spaced vertical extensions formed along the same edge as said first referenec abutment, said sine bar plate being pivotally connected between said spaced vertical extensions, in combination with means connected with and depending from the lower surface of said sine bar plate, spaced near the edge of the same opposite to said pivotal connection and correlated with the depression in said base member, said means being provided with a substantially spherical lower contacting surface, and a gauge block adapted to fit in said depression intermediate the same and the spherical depending means on said sine bar plate relatively to said base member, whereby the angular relationship between the upper working surface of said sine bar plate and said base member depends upon the height of the intermediate gauge block.

10. The combination according to claim 8, in which the base member of said slidable top has a pair of spaced vertical extensions formed along the same edge as said first reference abutment and at least one horizontal depression formed in the upper surface in the opposite edge, said sine bar plate being pivoted along one edge between said spaced vertical extensions, in combination with an accurately ground steel ball partially inserted in and attached to the lower surface of said sine bar plate near its opposite edge and correlated with the depression in said base member, and a gauge block adapted to fit in said depression intermediate the same and said steel ball for supporting said opposite edge of said sine bar plate relatively to said base member, whereby the angular relationship between the upper working surface of said sine bar plate and said base member depends upon the height of the intermediate gauge block.

11. The combination according to claim 8, in which the base member of said slidable top is provided with a pair of spaced vertical extensions formed along the same edge of the same as said first reference abutment and at least one horizontal depression in its upper surface near the opposite edge, said sine bar plate being pivotally mounted between said spaced vertical extensions, in combination with means connected with and depending from the lower surface of said sine bar plate, spaced near the edge of the same opposite to said pivotal connection and correlated with the depression in said base member, said means being provided with a substantially spherical lower contacting surface, and a gauge block adapted to fit in said depression intermediate the same and the spherical depending means on said sine bar plate for supporting the said opposite edge of said sine bar plate relatively to said base member, whereby the angular relationship between the upper working surface of said sine bar plate and said base member depends upon the height of the intermediate gauge blocks, the upper surface of said base member being provided with an additional substantially centrally disposed depression adapted to hold a temporary sine bar plate support when said gauge blocks are removed.

12. The combination according to claim 8, in combination with a diamond cutting tool on said vertical extension, mounted for swinging movement in a substantially vertical plane, and a diamond set plate on said extension having a controlling face positioned parallel to and exactly midway between the faces of the reference abutments, whereby when said diamond cutting tool is set in accordance with the diamond set plate, it will dress the face of the grinding wheel so that the same is parallel to and exactly midway between said reference abutments.

13. Apparatus for guiding tools and the like comprising, in combination, a frame, a grinding wheel rotatably supported on said frame, a top slidably mounted on said frame and forming a working surface for said apparatus, means for sliding said top toward and away from the face of said grinding wheel in a direction substantially at right angles to the plane of said wheel face, said slidable top comprising a base member slidable on said frame in a substantially horizontal plane, a vertical plate attached to said base member having a plane face forming a first reference abutment, positioned beneath, behind and parallel to the face of said grinding wheel, said base member being formed with a vertical extension projecting above said grinding wheel, a plate attached to said vertical extension and having a plane face mounted above, forwardly of and parallel to the base of said grinding wheel to form a second reference abutment, the distance from the face of said grinding wheel to each of said reference abutments being equal, and a sine bar plate pivotally connected to said base member at its edge near said first reference abutment, the upper surface of sine bar plate forming a working surface for said apparatus, an angularly adjustable tool holder comprising a bottom section having a plane lower surface, a top section pivotally connected to said bottom section about an axis parallel to the plane of said lower surface, means for clamping a tool to said top section, said bottom section being formed with a plurality of openings vertically spaced from one another and said top section being formed with one or more openings of the same size as those in the bottom section and so positioned relatively to the latter that upon pivotal movement of said top section one of the openings in said top section is aligned with one of the openings in said base member for one of a number of angular relationships between the tool and the lower plane surface of said bottom section, pin means adapted to pass through the aligned openings for holding said tool and bottom section in the said predetermined angular relationship, and a controlling pattern attached to said bottom section at a predetermined distance beneath the tool, and a step block having opposed parallel faces one of which is adapted to contact the work surface of said apparatus and the other of which is adapted to support the lower plane surface of said tool holder at such a distance above the working surface that when the tool holder is mounted on said step block, the tool therein, serving as a master guide, co-acts said second reference abutment, while the controlling pattern contacts the face of the grinding wheel, and, upon movement of the tool against said second reference abutment, is ground in accordance with the shape of said tool, whereby upon removal of said step block and the positioning of said tool holder upon said working surface, said controlling pattern co-acts with said first reference abutment, the work in said holder contacts the face of said grinding wheel and is ground in accordance with the shape of said controlling pattern, while the end and side reliefs of said tool are determined by the angular position of said tool relatively to the lower plane surface of said tool holder and the sine bar plate angle.

14. Apparatus for grinding tools and the like comprising, in combination, a frame, a grinding wheel rotatably supported on said frame, a top slidably mounted on said frame and forming a working surface for said apparatus, means for sliding said top toward and away from the face of said grinding wheel in a direction at right angles to the plane of said wheel face, said slidable top comprising a base member slidable on said frame in a substantially horizontal plane, a vertical plate attached to said base member, having a plane face forming a first reference abutment positioned beneath, behind and parallel to the base of said grinding wheel, said base member being formed with a vertical extension projecting above said grinding wheel, a plate attached to said vertical extension and having a plane face mounted above, forwardly of and parallel to the face of said grinding wheel to form a second reference abutment, the distance from the face of said grinding wheel to each of said reference abutments being equal, and a sine bar plate pivotally connected to said base member at its edge along said first reference abutment, the upper surface of said sine bar plate forming the working surface of said apparatus, a tool holder comprising a relatively stationary bottom plate having a plane lower surface, a guide mounted on said plate and a nut attached above said guide, a relatively slidable section having depending slides cooperating with said guide for permitting a transverse guided sliding movement of said section on said bottom plate parallel to the plane lower surface of the latter, a threaded shaft in said nut, rotatably supported on said slidable section, means on said slidable section for rotating said shaft in said nut to cause relative sliding movement between said slidable section and bottom plate, a top section pivotally connected to said slidable section, means for clamping the tool in said top section, means for holding said top section and tool in a predetermined angular relationship to said slidable section, and a controlling pattern attached to said bottom plate at a predetermined distance beneath the tool, and a step block having opposed parallel faces one of which is adapted to contact the working surface of said apparatus and the other of which is adapted to support the bottom surface of said tool holder at such a distance above the working surface that when the tool holder is mounted on said step block, the tool therein serving as a master guide co-acts with said second reference abutment while the controlling pattern contacts the face of the grinding wheel and, upon movement of the tool against said second reference abutment, the controlling pattern is ground in accordance with the shape of said tool, and whereby upon removal of said step block and the positioning of said tool holder upon the said working surface, said controlling pattern co-acts with said first reference abutment, the work in said holder contacts the face of said grinding wheel and is ground in accordance with the shape of said controlling pattern, while the end and side reliefs of said tool are determined by the angular position of said tool relatively to the bottom plate of said tool holder and the sine bar plate angle, and the relative position of said tool to said controlling pattern is determined by the position of the slidable section of the tool holder relatively to the bottom plate of the tool holder.

15. The combination according to claim 14, in which the means for rotating the shaft of the tool holder includes a pinion on said shaft, and a turn shaft rotatably mounted in the slidable section of said tool holder and having a pinion engaging the pinion on said first shaft.

16. The combination according to claim 14, in which the slidable section and the base plate of said tool holder are each provided with concomitant semi-circular openings, in combination with a circular pin insertable in said opening when the same are aligned for holding said slidable section and base plate in a predetermined relationship.

17. Apparatus for grinding tools and the like comprising, in combination, a frame, a grinding wheel rotatably supported on said frame, a top slidably mounted on said frame and forming a working surface for said apparatus, means for sliding said top toward and away from the face of said grinding wheel in a direction substantially at right angles to the plane of said wheel, said slidable top comprising a base member slidable on said frame in a substantially horizontal plane, a vertical plate attached to said base member, having a plane face forming a first reference abutment positioned beneath, behind and parallel to the face of said grinding wheel, said base member being also formed with a vertical extension projecting above said grinding wheel, a plate attached to said vertical extension having a plane face mounted above, forwardly of and parallel to the face of said grinding wheel to form a second reference abutment, the distance from the face of said grinding wheel to each of said reference abutments being equal, and a sine bar plate pivotally connected to said base member at its edge along said first reference abutment, the upper surface of said sine bar plate forming the working surface of said apparatus, an angularly adjustable tool holder comprising a bottom section having a plane lower surface, a top section pivotally connected to said base member about an axis parallel to the plane of said lower surface, means for clamping a tool to said top section, said bottom section being formed with a depression in its upper surface rearwardly of the pivotal connection with the top section, and said top section being formed with a hemispherical depending projection above the depression in said bottom section, a gauge block in said depression to support said top section and tool by contacting with said hemispherical projection in the desired angular position, and a controlling pattern attached to said bottom section at a predetermined distance beneath the tool, and a step block having opposed parallel faces, one of which is adapted to contact the working surface of said apparatus and the other of which is adapted to support the plane lower surface of said tool holder at such a distance above the working surface that when the tool holder is mounted on said step block, the tool therein, serving as a master guide, co-acts with said second reference abutment, while the controlling pattern contacts the face of the grinding wheel and, upon movement of the tool in accordance with said second reference abutment, is ground in accordance with the shape of said tool, whereby upon removal of said step block and the positioning of said tool holder upon said working surface, said controlling pattern co-acts with said first reference abutment, the work in said holder contacts the face of said grinding wheel and is ground in accordance with the shape of said controlling pattern, while the end and side reliefs of said tool are determined by the angular position of the top section of said tool holder relatively to the plane lower surface of its bottom section and the sine bar plate angle.

18. In an apparatus for guiding tools and the like, the combination of a grinding wheel, means forming a plane working surface positioned beneath and at an angle to the face of said wheel, an angularly adjustable tool holder, a projecting tongue mounted on the side of said tool holder, a rake grinding fixture having opposed parallel faces, adapted to be mounted with one of said parallel faces on said working surface, means for holding said rake grinding fixture on said working surface in a predetermined position relatively to said grinding wheel, the other parallel surface of said grinding fixture being formed with a groove parallel to the face of the grinding wheel adapted to slidably receive the tongue on the side of said tool holder, and clamping means for holding a tool in said tool holder in such a manner that sliding movement of said tool holder in said rake grinding fixture moves the top of said tool along the face of said grinding wheel.

19. The combination according to claim 18, in which said tool holder comprises a bottom section on which said tongue is mounted, a top section to which said tool is clamped, and means for adjusting the angular relationship between said top and bottom sections, whereby, when the tongue on said bottom section is slidably mounted in said groove and the top of the tool is moved along the face of the grinding wheel, the back rake of the tool top is determined by the angle between said top and bottom sections.

20. The combination according to claim 18, in combination with means for changing the angular relationship between said working surface and the face of said wheel, whereby, when the tool holder is moved in said groove with the top of the tool against said grinding wheel, the side rake of the top is determined by the angular relationship between the face of said grinding wheel and said working surface.

21. In a grinding apparatus for tools and the like of the type having a grinding wheel whose face is positioned above and along the rear edge of the working surface of the apparatus, the combination of an angularly adjustable table forming said working surface comprising a base member having a pair of spaced vertical extensions formed along its rear edge beneath the grinding wheel and at least one horizontal upwardly facing supporting face formed on its upper surface near the opposite edge, a sine bar plate whose upper surface forms the working surface of said table, pivoted at one edge between said vertical extensions, means connected with and depending from the lower surface of sine bar plate, spaced near the opposite edge of the same and correlated with the supporting face on said base member, said means being provided with a downwardly facing contacting surface, and a gauge block adapted to fit between said face and the downwardly facing surface of said sine bar plate for supporting the opposite edge of said sine bar plate relatively to said base member, whereby the angular relationship between the upper working surface of said sine bar plate and the face of said grinding wheel depends upon the height of the intermediate gauge block; the upper surface of said base member being provided with an additional substantially centrally disposed depression adapted to hold a temporary sine bar plate support when said gauge block is removed.

22. In a grinding apparatus for tools and the like of the type having a grinding wheel whose face is positioned above and along the rear edge of the working surface of the apparatus, the combination of an angularly adjustable table forming said working surface comprising a base member having a pair of spaced vertical extensions formed along its rear edge beneath the grinding wheel and at least one horizontal upwardly facing supporting face formed on its upper surface near the opposite edge, a sine bar plate whose upper surface forms the working surface of said table, pivoted at one edge between said vertical extensions, a substantially vertical plate attached along the one edge of said base member beneath the grinding wheel and extending above and adjacent the upper surface of the sine bar plate to form a reference abutment for said table relatively to the face of said grinding wheel, means connected with and depending from the lower surface of said sine bar plate, spaced near the opposite edge of the same and correlated with the supporting face on said base member, said means being provided with a downwardly facing contacting surface, and a gauge block adapted to fit between said face and the downwardly facing surface on said sine bar plate for supporting the opposite edge of said sine bar plate relatively to said base member, whereby the angular relationship between the upper working surface of said sine bar plate and the face of said grinding wheel depends upon the height of the intermediate gauge block.

23. An adjustable tool holder comprising, in combination, a relatively stationary bottom plate having a plane lower surface, a guide mounted on said plate and a nut attached above said guide, a relatively slidable section having depending slides cooperating with said guide for permitting a transverse guided sliding movement of said section on said bottom plate parallel to the plane lower surface of the latter, a threaded shaft in said nut, rotatably supported on said section, means on said slidable section for rotating said shaft in said nut to cause relatively sliding movement between said slidable section and the bottom plate, said slidable section and said bottom plate each being provided with concomitant semicircular openings, a circular pin insertable in said openings when the same are aligned for holding said slidable section and base plate in a predetermined relationship, a top section pivotally connected to said slidable section, means for clamping the tool to said top section, and means for holding said top section and tool in a predetermined angular relationship to said slidable section.

24. An angularly adjustable tool holder comprising, in combination, a bottom section having a plane lower surface, said bottom section being provided with a forward section having a recess in its lower surface adapted to receive a controlling pattern, said recess being of such depth that the lower surface of the controlling pattern is flush with the lower plane surface of said bottom section, a top section pivotally connected to said bottom section about an axis parallel to the plane of said plane lower surface, means for clamping a tool to said top section, said bottom section being formed with a depression in its upper surface rearwardly of the pivotal connection with the top section, and said top section being formed with a hemispherical depending projection above the depression in the bottom section, and a gauge block in said depression to support said top section and tool by contact with said hemispherical projection in the desired angular position.

25. An angularly adjustable tool holder comprising, in combination, a bottom section having a plane lower surface, a top section pivotally connected to said bottom section about an axis parallel to the plane of said plane lower surface, means for clamping a tool to said top section, said bottom section being formed with a depression in its upper surface rearwardly of the pivotal connection with the top section, and said top section being formed with a hemispherical depending projection above the depression in the bottom section, a gauge block in said depression to support said top section and tool by contact with said hemispherical projection in the desired angular position; a vertical projection on said bottom section, a pair of depending legs on said top section fitting on opposite sides of said projection, and means for clamping said legs against said projection to maintain the angular relationship between said top and bottom sections as determined by the gauge block.

26. An angularly adjustable tool holder comprising, in combination, a bottom section having a plane bottom surface, a top section pivotally connected to said bottom section about an axis parallel to the plane of said bottom surface, means for clamping a tool to said top section, said bottom section being formed with a plurality of openings vertically spaced from one another and said top section being formed with one or more openings of the same size as those in the bottom section and so positioned relatively to the latter that upon pivotal movement of said top section one of the openings in said top section is aligned with one of the openings in said bottom section for a predetermined angular relationship between the tool and the bottom plane surface of said bottom section, and pin means adapted to pass through said aligned openings for holding said tool and bottom section in the said predetermined angular position, said bottom section being provided with a forward extension having a recess in its bottom surface adapted to receive a controlling pattern, said recess being of such depth that the lower surface of the controlling surface is flush with the plane bottom surface of said bottom section.

WALTER MARK BURA.